United States Patent [19]

Prin et al.

[11] Patent Number: 5,429,780
[45] Date of Patent: Jul. 4, 1995

[54] MANUFACTURE OF SILICON CARBIDE FOAM FROM A POLYURETHANE FOAM IMPREGNATED WITH RESIN CONTAINING SILICON

[75] Inventors: Marie Prin, Moirans; Gérard Baluais, La Murette, both of France

[73] Assignee: Pechiney Recherche, Courbevoie, France

[21] Appl. No.: 234,962

[22] Filed: Apr. 28, 1994

[30] Foreign Application Priority Data

May 13, 1993 [FR] France ................... 93 06015

[51] Int. Cl.⁶ .............................................. B29C 65/00
[52] U.S. Cl. ........................................ 264/44; 264/43; 264/56; 264/59; 423/345; 501/88; 521/54; 521/55; 523/218; 523/219; 528/484
[58] Field of Search .............. 264/43, 44, 56, 59; 423/345; 501/88; 521/55, 54; 523/218, 219; 528/484

[56] References Cited

U.S. PATENT DOCUMENTS

| | | |
|---|---|---|
| 3,345,440 | 1/1968 | Googin et al. |
| 4,564,496 | 1/1986 | Gupta et al. ................... 264/44 |
| 4,777,152 | 10/1988 | Tsukada ....................... 501/80 |
| 5,093,289 | 3/1992 | Braetsch et al. |
| 5,196,389 | 3/1993 | Dubots. |
| 5,217,930 | 6/1993 | Dubots. |
| 5,283,019 | 2/1994 | Atwell et al. ................. 264/44 |

FOREIGN PATENT DOCUMENTS

| | | |
|---|---|---|
| 1484116 | 1/1968 | France. |
| 78-07448A | 12/1977 | Japan. |
| 52-148467 | 12/1977 | Japan. |
| 88-261527 | 8/1988 | Japan. |

OTHER PUBLICATIONS

American Ceramic society Bulletin, vol. 71, No. 11, Nov. 1992, Columbus US, pp. 1674–1682, Saggio et al.

*Primary Examiner*—Morton Foelak
*Attorney, Agent, or Firm*—Dennison, Meserole, Pollack & Scheiner

[57] ABSTRACT

A process for preparing a silicon carbide foam by impregnating a polyurethane foam with a suspension of silicon powder in an organic resin, heating progressively to polymerize the resin, heating further to carbonize the polyurethane foam and resin, and finally further heating to carburize the silicon contained in the resin suspension by means of carbon obtained from the carbonization of the foam and resin. The foam obtained is characterized by high macroporosity and a mesoporosity which is variable according to the carburizing temperature.

14 Claims, 1 Drawing Sheet

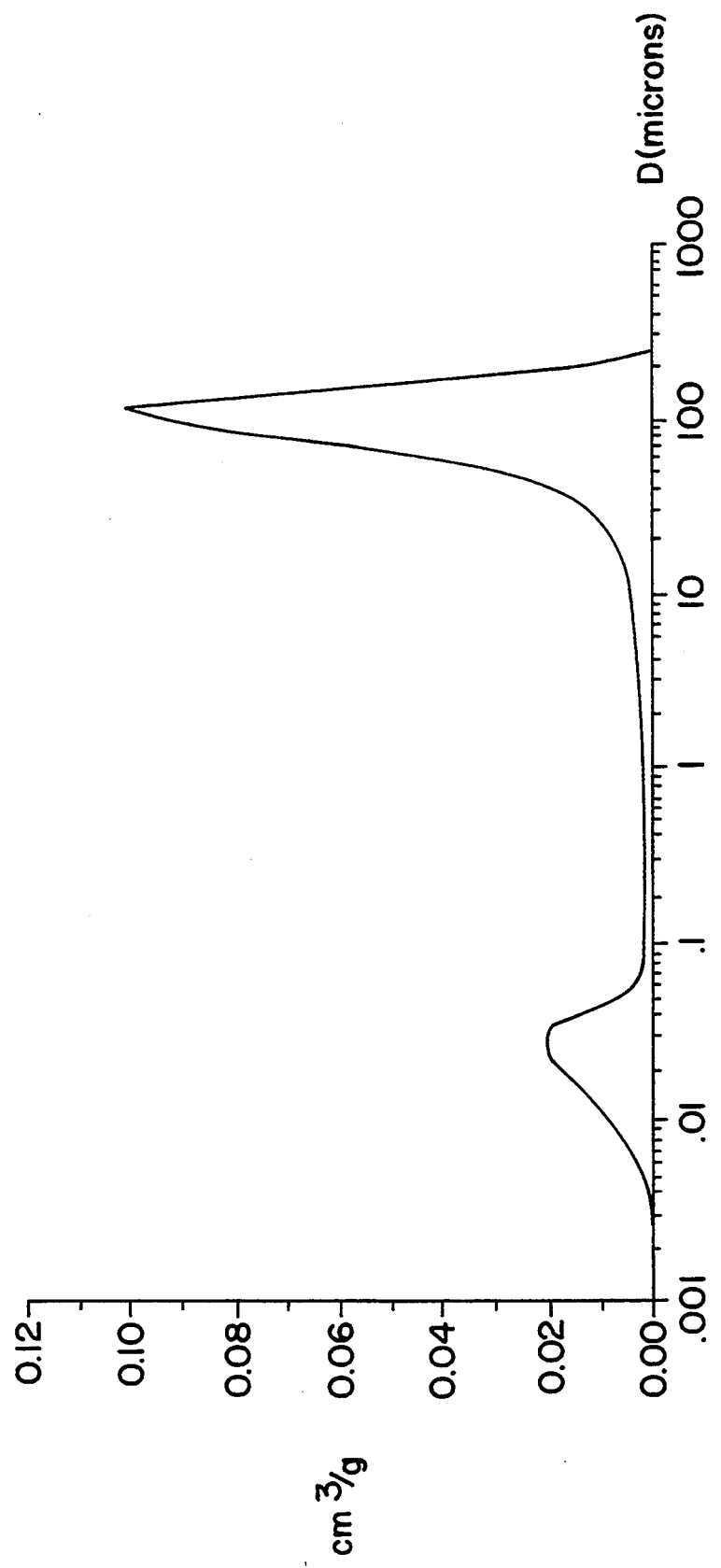

MANUFACTURE OF SILICON CARBIDE FOAM FROM A POLYURETHANE FOAM IMPREGNATED WITH RESIN CONTAINING SILICON

TECHNICAL FIELD OF THE INVENTION

The invention relates to the technical field of porous structures or foams made from silicon carbide intended to serve as catalysts or catalyst carriers for the chemical or petrochemical industry or catalysts or filters for exhaust silencers.

THE PROBLEM POSED

The specific surface area of a catalyst is due to three types of porosity: a macroporosity due to pores with a mean diameter greater than 2 μm, a mesoporosity due to pores with a mean diameter of 30–350 angstroms and a microporosity due to pores with a mean diameter of 5–15 angstroms. A catalyst must have sufficient macroporosity to give the gas to be treated access to the micro- and especially the mesopores responsible for the catalytic activity proper.

For certain catalytic applications, in particular for catalysing the oxidation of exhaust gases, it is necessary to choose the geometry of the carrier or catalyst and to produce it in the form of monolithic pieces, ensuring that the catalyst is accessible to the gas to be treated by its macroporosity. With exhaust filters for diesel engines, the problem is substantially the same, except that the mesoporosity does not need to be as highly developed since the filtration involves only physical phenomena and not a catalytic reaction.

The inventors posed themselves the problem of obtaining catalyst carriers made from practically pure silicon carbide foam in monolithic form and having a large open macroporosity allowing easy access to the reaction gases.

OBJECT OF THE INVENTION

The invention relates to a process for manufacturing catalyst carriers or filters made of silicon carbide and having the properties indicated above, from a polyurethane foam which is impregnated with a suspension of silicon in a polymerisable organic resin and which is raised to a high temperature in order successively to polymerise the resin, to carbonise the resin and polyurethane foam and finally to carburise the carbon originating from the resin and foam.

It also relates to porous silicon carbide structures which can be applied to the production of catalytic chambers or filters for diesel engines.

THE PRIOR ART

European patent EP-B-0313480 (Péchiney Electrométallurgie) discloses a process for producing silicon carbide grains with a specific surface area of at least 100 m$^2$/g, intended to serve as a catalyst carrier, and consisting of generating SiO vapours by heating a mixture of SiO$_2$ +Si to a temperature of between 1100 and 1400/° C at a pressure of between 0.1 and 1.5 hPa and reacting these vapours on reactive carbon with a specific surface area greater than 200 m2/g at a temperature of between 1100 and 1400/° C. European patent application EP-A-0440569 (Péchiney Electrométallurgie) describes a process for obtaining porous solid bodies of refractory carbide with a high specific surface area, characterised in that a polymeric and/or copolymerisable organic compound which is carbonisable and capable of giving a solid carbon network is mixed with a metal powder or metalloid powder or one of its compounds which can be reduced by carbon, the mixture is shaped, the organic compound is cross-linked or hardened, and the shaped mixture is heat-treated in order to carbonise the said compound between 500 and 1000° C. and then to effect carbonisation.

European patent application EP-A-0511919 (Péchiney Electrométallurgie) describes a carrier on which the catalytically active product is deposited. The carrier has mechanical or physical properties which are of interest for the required operating conditions, but a mediocre specific surface area. The catalytically active product, a metallic carbide, is obtained by immersing the carrier in a suspension of a reducible compound of the metal in a solution of an organic compound, carbonising this compound, reducing the metallic compound and carburising the metal. The carbide thus obtained has a high specific surface area. The carrier preferably consists of silicon carbide prepared by carbonising a paste containing silicon, carbon and an organic resin.

The unpublished European patent application 92-420429 (GIE Péchiney Recherche) describes a metallic carbide foam or silicon carbide foam intended to be used as a catalyst or catalyst carrier for the chemical or petrochemical industry or for exhaust silencers, and the process for manufacturing it. The foam is in the form of a three-dimensional network of interconnected cages, the length of the edges of which is between 50 and 500 micrometers and the BET surface area of which is between 20 and 100 m$^2$/g. The manufacturing process consists of starting from a carbon foam, increasing its specific surface area by an activation treatment by means of carbon dioxide, and finally bringing the foam thus activated into contact with a volatile compound of the metal whose carbide it is desired to obtain.

None of these above processes describes bringing an organic suspension containing silicon into contact with an organic foam precursor.

The document EP-A-0337285 describes the obtaining of a mineral foam from a polyurethane foam but, since the final pyrolysis takes place in nitrogen, a surface deposit consisting of SiO$_2$ and/or silicon oxynitride is obtained rather than solid silicon carbide (see EP 0337285, A2, column 8, lines 45–47).

DESCRIPTION OF THE FIGURES

The single FIGURE shows the distribution of the porous volume as a function of the diameter of the pores in a sample of foam according to the invention.

DESCRIPTION OF THE INVENTION

The process for manufacturing silicon carbide with a large specific surface area from a polyurethane foam according to the invention consists of:
 a) the preparation of this polyurethane foam;
 b) elimination, if necessary, of any solvent by heating;
 c) polymerisation of the resin by progressively increasing the temperature to 250° C. with a rate of temperature rise of around 5° C./min;
 d) simultaneous carbonisation of the polyurethane foam and resin by progressively increasing the temperature from 250° C. to 1000° C. in an inert atmosphere;
 e) carburising of the silicon contained in the resin suspension by means of the carbon originating from the carbonisation of the foam and resin by progressively increasing the temperature from 1000° C. to a temperature T of between 1300° and 1600° C. with a rate of temperature rise of around 3° C./min in an inert atmosphere and maintaining at the temperature T for two hours, all the time in an inert atmosphere;

f) cooling of the silicon carbide thus obtained; and is characterised in that the preparation a) of the polyurethane foam consists of:

a1) impregnation of the latter with a suspension of Si in powder form in at least one oxygenated organic resin and an optional solvent, the ratio by weight of Si to the resin being between 0.58 and 1.17 and preferably between 0.58 and 0.8, and a2) elimination of the excess suspension so that the ratio of the weight of resin to the weight of polyurethane is between 2.5 and 5.

Each of these successive steps is now described in detail.

a1) impregnation of the polyurethane foam with a suspension of silicon powder in an organic resin.

a2) elimination of the excess suspension so that the ratio of the weight of resin impregnating the polyurethane to the weight of polyurethane is between 2.5 and 5;

The choice of the resin is dictated by two considerations: its viscosity and the percentage by weight of oxygen in the resin molecule polymerised. The viscosity must be chosen so as to be fairly low so that the resin suspension can penetrate to the heart of the foam, and less than 3 Pa.s. This viscosity may be adjusted by diluting the resin with a solvent such as alcohol or by adding very fine carbon black. Preliminary tests, consisting of immersing cubic samples of foam with an edge of 30 mm and checking whether the resin has succeeded in penetrating to the heart, may usefully be applied.

The percentage by weight of oxygen has great importance since, at the time of carbonisation of the impregnated foam, it assists, through a gradual oxidation of the carbon which is forming, in activating this carbon, that is to say developing its mesoporosity and increasing its specific surface area. It has been found that the proportion by weight of oxygen in the polymer obtained from the resin ought to be at least 15% and preferably around 25%. Amongst these resins are found polycarbonates, polyesters and especially polymers obtained by polycondensation of furfuryl alcohol in which the proportion of oxygen is approximately 26%, which constitute the preferred polymer.

The distribution of the diameters of the silicon grains must be centred on a mean value D50 (by volume) of less than 75 micrometers and preferably less than 10 micrometers.

The quantity and composition of the impregnations suspension are defined by two coefficients:

$a$ = weight of resin/weight of polyurethane = $M_r/M_{pu}$ $b$ = weight of silicon/weight of resin = $M_{si}/M_r$ In the following, when it is a question of the weight $M_r$ of resin, the total resin plus any polymerisation catalyst must be understood. For example, hexamethylenetetramine is added as a catalyst to the preferred resin, which is furfuryl alcohol.

With regard to the coefficient a, it is clear that if it is too low, the carbon structure obtained will be very porous and will therefore have insufficient mechanical strength; if it is too high, the macroporous structure will be blocked by the products of carbonisation of the resin and will therefore not be preserved. It is however necessary for the quantity of resin to be sufficient to impregnate the mass of polyurethane as far as the heart. It may thus prove necessary to adjust the viscosity of the resin when hot by acting on the quantity of polymerisation catalyst and the viscosity when cold by diluting it in alcohol or adding carbon black.

The inventors have found that this coefficient a ought to be between 2.5 and 5. This limitation of the value of a is explained in this way:

The carbon originating from the carbonisation of the polyurethane and resin occupies a certain "real" or "solid" volume (the quotient of the weight of carbon $M_c$ and its density $d_c$) equal to $V_c$. In order to obtain sufficient strength of the carbon foam, it is necessary for this volume of carbon $V_c$ to occupy at least 25% of the "real" or "solid" volume $V_{pu}$ of the initial polyurethane (the quotient of the weight of polyurethane $M_{pu}$ and its density $d_{pu}$). In order to keep a macroporous structure of the carbon foam, it is necessary for this volume of carbon $V_c$ to occupy at least 100% of the "real" or "solid" volume $V_{pu}$ of the initial polyurethane. If the ratio $V_c/V_{pu}$, which is a volume yield of the carbonisation, is termed x, this should therefore give:

$$0.25 < x < 1$$

A simple calculation enables the weight yield $R_x$ corresponding to x to be calculated:

$$R_x \text{ (in \%)} = 100 \cdot M_C/(M_{pu} \cdot (1 + a)) \qquad (1)$$
$$= 100 \cdot x \cdot (d_C/d_{pu})/(1 + a)$$

The coefficient b is derived easily from the stoichiometry of the SiC formation reaction:

$$Si + C = SiC$$

The weight of silicon $M_{Si} = (28/12) \cdot M_c = 2.333 \cdot M_c$ (atomic weights of Si and C=28 and 12 respectively). According to (1), $M_c = (R/100) \cdot M_{pu} \cdot (1+a)$ Finally this gives:

$$M_{Si} = 2.333 \cdot (R/100) \cdot M_{pu} \cdot (1+a) \qquad (2)$$

and $$M_{Si} = b \cdot M_r \text{ where } b = (M_{Si}/M_{pu}) \cdot (M_{pu}/M_r) \qquad (3)$$
$$b = 2.333 \cdot (R/100) \cdot (1+a) \cdot (1/a)$$

In the field of the invention, x is generally around 0.5 and, the densities of carbon and polyurethane being approximately 2 and 0.8 respectively, formula (1) is written:

$$R = 100 \cdot (0.5 \cdot 2/0.8)/(1+a) = 125/(1+a) \qquad (4)$$

Combining (3) and (4), the value of $b = M_{Si}/M_r$ is equal to:

$$b = 2.333 \cdot (R/100) \cdot (1+a) \cdot (1/a) = 2.917/a \qquad (5)$$

The last equation (5) states that, for a weight $b \cdot M_r$ of silicon, added to a weight $M_r$ of resin during the preparation of the mixture, the ratio a of the weight of resin to the weight of polyurethane should not exceed 2,917/b.

For example, for a value of b of 0.79, the maximum value of a is 3.7 and the corresponding yield R is approximately 27%.

For the extreme cases:

x=0.25 and a=2.5, b is equal to 0.58 x=1 and a=5, b is equal to 1.17

In practice, a suspension of silicon in the resin is prepared, in the proportions defined by coefficient b. The foam is impregnated simply by immersion in this resin, optionally under vacuum or under pressure. A check is made that the foam is indeed impregnated to its heart. In general the degree of impregnation, verified by weighing, is greater than the value of the sought-for coefficient a. The excess quantity of resin is then eliminated by centrifuging until this coefficient a is obtained, which is checked by weighing. This centrifuging at 1000 rev/min may take several hours.

In order to check, by weighing, the quantity of impregnation product in the impregnated foam, the ratio c of the total weight (foam+impregnation product) to the weight of polyurethane foam is used. This ratio is equal to:

$$c = (M_{pu} + M_r + M_{Si})/M_{pu} = M_{pu} \cdot (1 + a + b \cdot a)/M_{pu} \quad (6)$$
$$= 1 + a \cdot (b + 1)$$

or again, by combining (5) and (6):

$$c_{max} = 3.917 + a = 3.917 + 2.917/b$$

The centrifuging will therefore be checked by successive weighings of the sample. This will be continued until the total weight is equal to or less than $c_{max} \cdot M_{pu}$.

c) polymerisation of the resin contained in the suspension by progressively increasing the temperature to 250° C. with a rate of temperature rise of around 5° C./min;

d) simultaneous carbonisation of the polyurethane foam and resin by progressively increasing the temperature from 250° C. to 1000° C. with a rate of temperature rise of between 1° C./min and 10° C./min in an inert atmosphere;

Inert atmosphere means an atmosphere which is non-reactive vis-a-vis Si at high temperature; it must in particular contain less than 100 ppm of oxygen and less than 1% nitrogen; it advantageously consists of a flow of argon of commercial purity.

It has also been remarked that the best properties of the final Si carbide are obtained if the mean velocity of the scavenging gas during this step is between 0.01 and 1 cm/sec. and preferably between 0.05 and 0.2 cm/sec.

e) carburising of the silicon contained in the suspension of resin by the carbon originating from the carbonisation of the foam and resin by progressively increasing the temperature from 1000° C. to a temperature T of between 1300° and 1600° C. with a rate of temperature rise of around 3° C./min in an inert atmosphere and maintaining at the temperature T for 2 hours, all the time in an inert atmosphere.

Verification that all the carbon available has been converted into SiC can be effected simply by weighing the carbide foam. In fact, the weight of SiC, $M_{SiC}$, is related to the weight of carbon $M_C$ by the stoichiometric equation:

$$M_{SiC} = M_C \cdot (40/12) = 3.333 \cdot M_C$$

According to equation (1), $$R_x \text{ (as a fraction)} = M_C/(M_{pu} \cdot (1+a))$$

$$M_C = R_x \cdot M_{pu} \cdot (1+a)$$

$$M_{SiC}/M_{pu} = 3.333 \cdot R_x \cdot (1+a)$$

If equation (4) is satisfied, this finally gives:

$$M_{SiC}/M_{pu} = 3.333 \cdot 1.25 = 4.17 \quad (8)$$

This last equation makes it possible to calculate the theoretical weight of silicon carbide which must be obtained from a given weight of initial polyurethane.

The choice of the final temperature T is dictated by the size of the mesoporosity volume which it is desired to achieve. The higher the temperature T, the smaller this volume. Thus, for preparing catalyst carriers, a temperature T of between 1300° C. and 1400° C. is preferred, whilst for preparing diesel engine filters, a higher temperature T is preferred, between 1400° C. and 1600° C.

The product obtained is in the first case a silicon carbide catalyst or catalyst carrier having a large open macroporosity allowing easy access to the reaction gases, characterised in that the BET surface area is between 10 and 50 m²/g, in that its bimodal porosity comprises a mesoporosity centred on a pore diameter value of between 0.0275 and 0.0350 μm with a standard deviation of less than 0.0160 μm and a macroporosity centred on a pore diameter value of between 100 and 150 μm with a standard deviation of less than 50 μm, and in that the carbide contains not more than 0.1% by weight of residual silicon.

If the initial polyurethane foam does not have open porosity or has insufficient open porosity for the application envisaged, it is possible, before steps a1) and a2), to attack the polyurethane foam with a soda solution so as to obtain the desired open porosity. This attack is preferably effected in a 4% (by weight) soda solution at a temperature of approximately 65° C. for approximately 5 to 10 min.

The permeability of the carbides according to the invention was compared with that of a conventional catalytic support, made from cordierite, with the same shape and same dimensions. This is, in fact, a characteristic of use which is very important with exhaust silencer catalysts, which must not cause an excessively high pressure drop in the high level of flow of exhaust gases.

A pressure drop per unit of length P/l is given by the formula:

$$P/l = \mu \cdot d/k_1 \cdot S + m \cdot d^2/k_2 \cdot S^2$$

where
   P is the pressure drop
   l the length of the sample
   S the cross section of the sample
   μ the viscosity of the fluid
   m the density of the fluid
   d the volume flow rate of the fluid $k_1$ and $k_2$ two coefficients characteristic of the permeability of the sample, $k_1$ being the so-called darcian permeability coefficient and $k_2$ the so-called non-darcian permeability coefficient.

It should be noted that, all other things being equal, the higher $k_1$ and $k_2$, the smaller the pressure drop P, that is to say the higher the permeability.

The following table gives the values of the coefficients $k_1$ and $k_2$ for the conventional cordierite catalyst and for the SiC foam according to the invention.

|  | $k_1$ (m$^2$) | $k_2$ (m) |
| --- | --- | --- |
| Cordierite catalyst | $9 \times 10^{-9}$ | $1.4 \times 10^{-4}$ |
| SiC foam | $8 \times 10^{-9}$ | $1.4 \times 10^{-4}$ |

It is clear from this table that the coefficients $k_1$ and $k_2$ are of the same order of magnitude for the silicon carbide according to the invention as for the cordierite and that their permeabilities are therefore comparable.

The silicon carbide foam can therefore, like the cordierite, be impregnated thereafter with an active phase based on platinum, rhodium or palladium serving as a catalyst.

The product obtained is in the second case a silicon carbide filter with a large open macroporosity allowing easy access to the gases, characterised in that its BET surface area is less than 5m$^2$/g, in that its porosity comprises a very low mesoporosity and a macroporosity centred on a pore diameter value of between 100 and 150 μm with a standard deviation of between 30 and 50 μm, and in that the carbide contains no more than 0.1% by weight of residual silicon.

EXAMPLES

Example 1

A sample of polyurethane foam with a volume of 90 cm$^3$ and an apparent density of 0.03 g/cm$^3$, is attacked by a 4% soda solution at 55° C. for 8 minutes. A weight loss of 18.4% is noted. The foam, which weighed 2.7 g at the outset, therefore weighs no more than 2.20 g. A mixture of 95% (by weight) furfuryl alcohol and 5% hexamethylenetetramine is prepared, serving as a polycondensation catalyst, but the action of which commences only as from approximately 170° C. The mixture therefore remains stable at ambient temperature, which allows the subsequent operations without polymerisation of the resin. Silicon in powder form with a mean grain diameter of 60 μm, is added in a proportion of 7.9 g of silicon for 10 g of resin. The coefficient b is therefore equal to 0.79. The polyurethane foam is then immersed in the suspension obtained until the impregnation reaches the heart of the foam. Centrifuging is then carried out so that the weight of resin impregnating the sample is reduced to 5.52 g. The weight of silicon is then 4.36 g and the total weight of the impregnated sample is 12.08 g. The coefficient a is equal to 5.52/2.20 = 2.51 and the ratio c is 12.08/2.20 = 5.49, a value less than: $C_{max} = 3.917 + 2.917/b = 7.61$.

There is therefore a lack of impregnation, which will result in a quantity of SiC less than the theoretical quantity and the presence of an excess of carbon in the carburised foam.

The impregnated foam is then heat-treated in order, successively: to polymerise the resin by increasing the temperature to 250° C. with a rate of temperature rise of around 5° C./min, to carbonise the polyurethane foam and resin by increasing the temperature from 250° C. to 1000° C. with a rate of temperature rise of around 1° C./min in a non-oxidising atmosphere; to carburise the silicon by means of the carbon originating from the carbonisation of the foam and resin by increasing the temperature from 1000° C. to 1350° C. with a rate of temperature rise of around 3° C./min in a non-oxidising atmosphere and maintaining for 2 hours at 1350° C., all the time in a non-oxidising atmosphere.

After this treatment, the weight of foam obtained is 6.98 g. After a further treatment in air at 800° C., a weight loss of 6.5% is observed, corresponding to the combustion of the excess of carbon, which reduces the weight of SiC foam to 6.53 g, less, according to (8), than the maximum theoretical quantity of 4.17 × 2.20 = 9.174 g. The quantity of residual silicon is very much less than 1%.

Example 2

A sample of polyurethane foam with a volume of 43.75 cm$^3$ and an apparent density of 0.07 g/cm$^3$, is attacked by a 4% soda solution at 65° C. for 8 minutes. No weight loss is noted, the used foam having an open porosity. The sample therefore weighs 3.06 g. A mixture of 95% (by weight) furfuryl alcohol and 5% hexamethylenetetramine is prepared as in Example 1. Silicon in powder form with a mean grain diameter of 60 μm is added to this mixture in a proportion of 7.9 g of silicon for 10 g of resin as in Example 1 and, in order to facilitate impregnation, 0.15 g of carbon black, still for 10 g of resin. The coefficient b remains equal to 0.79. The polyurethane foam is then immersed in the suspension obtained until the impregnation reaches the heart of the foam. Centrifuging is then carried out so that the weight of resin impregnating the sample is reduced to 11.74 g. The weight of silicon is then 9.28 g and the total weight of the impregnated sample is 24.08 g. The coefficient a is equal to 11.74/3.06 = 3.84 and the ratio c is 24.08/3.06 = 7.86, a value slightly greater than:

$$C_{max} = 3.917 + 2.917/b = 7.61$$

There is therefore a slight impregnation excess, which should cause a slight excess of silicon compensated for however by the supplementary addition of carbon black to the resin. In fact, this is very close to the theoretical quantities of carbon and silicon, which will result in a quantity of SiC also very close to the theoretical quantity without any excess of carbon in the carburised foam. In fact, after heat treatment under the conditions of Example 1, the weight of foam obtained is 13.30 g and, according to (8), than the maximum theoretical quantity is 4.17 × 3.06 = 12.8 g [sic]. The quantity of residual silicon remains less than 1%.

Example 3

A sample of polyurethane foam with a volume of 72 cm$^3$ and an apparent density of 0.067 g/cm$^3$ is attacked by a 4% soda solution at 65° C. for 8 minutes. A weight loss of 2.33% is noted. The foam, which weighed 4.83 g at the outset, therefore weighs no more than 4.72 g. A mixture of 95% (by weight) furfuryl alcohol and 5% hexamethylenetetramine is prepared as in Example 1. Silicon in powder form with a mean grain diameter of 60 μm is added to this mixture in a proportion of 7.9 g of silicon for 10 g of resin. The coefficient b is therefore equal to 0.79. The polyurethane foam is then immersed in the suspension obtained until the impregnation reaches the heart of the foam. Centrifuging is then carried out so that the weight of resin impregnating the sample is reduced to 19.24 g. The weight of silicon is then 15.2 g and the total weight of the impregnated sample is 39.16 g. The coefficient a is equal to 19.24/4.71=4.08 and the ratio c is 39.16/4.72=8.30, a value greater than:

$$C_{max} = 3.917 + 2.917/b = 7.61.$$

There is therefore an excess of impregnation which will result in a quantity of SiC greater than the theoretical quantity. In fact, after heat treatment under the conditions of Example 1, the weight of foam obtained is 23.1 g, greater, according to (8), than the maximum theoretical quantity of 4.17×4.71=19.7 g. The quantity of residual silicon remains less than 1%.

Example 4

The porous texture of the carbide foam obtained in Example 2 was determined by comparison with that of a carbide foam obtained by reacting carbon foam with silicon monoxide according to the disclosure of the unpublished European patent application 92-420429 and referenced "SiO". Since the latter foam contains, after carburising, an appreciable quantity of carbon which has not reacted, the comparison also relates to the carbide foams which have undergone a subsequent oxidation treatment of 3 hours in air at 800° C. intended to eliminate this excess carbon. This treatment was also applied to the foam of Example 2 although it contains only a little or no free carbon. It is identified in the table below by the comment "oxidised".

| FOAM | PORES | METH. $m^2/g$ | MAX.ABSC. $\mu m$ | MAX. ORD $cm^2/g$ | STANDARD DEVIATION $\mu m$ |
|---|---|---|---|---|---|
| EX 2 | meso | nitrogen 39 | 0.0290 | 0.02106 | 0.0139 |
| EX 2 oxidised | meso | nitrogen 26 | 0.0350 | 0.01825 | 0.0156 |
| SiO | meso | nitrogen 156 | 0.0124 | 0.01825 | 0.0156 |
| SiO oxidised | meso | nitrogen 36 | 0.0124 | 0.01825 | 0.0156 |
| EX 2 | meso | mercury | 0.0275 | 0.014 | 0.0087 |
| EX 2 | macro | mercury | 117.5 | 0.1025 | 41.97 |

The second column indicates the nature of the pores (meso or macro pores) revealed by the method used, which is entered in the third column: nitrogen adsorption or mercury porosity meter. In the case of nitrogen adsorption, the BET surface area is also given in this column. The fourth and fifth columns indicate the abscissa (in $\mu m$) and the ordinate (in $cm^3/g$) of the maximum value in the distribution of the volume of the pores as a function of their diameter. Finally the sixth column indicates the standard deviation of the distribution.

The conclusions which can be drawn from this table are as follows:
  the carbide foams according to Example 2 of the invention have a bimodal distribution whether or not they have been oxidised: a first mode is at 0.0290 $\mu m$ (non-oxidised foam) or at 0.0350 $\mu m$ (oxidised foam) with respective standard deviations of 0.139 and 0.156 $\mu m$. The effect of the oxidation treatment is to increase the mean diameter of the mesopores;
  the carbide foams obtained from gaseous SiO have a distribution of mesopores centred on an adjacent value which is lower before oxidation and of the same order after oxidation;
  the carbide foams according to Example 2 have a second mode at 117.5 $\mu m$ (macropores). In FIG. 1, the distribution of the pores of the sample of Example 2 is shown. It can be seen very clearly that the distribution of these macropores forms a very sharp peak centred on 100-150 $\mu m$. This is one of the essential characteristics of these foams.
  finally, good agreement is found between the distributions of pores calculated by adsorption-desorption of nitrogen and those measured with the mercury porosity meter.

Example 5

All the following examples were carried out by impregnating a polyurethane foam with a weight of 1.05 to 1.14 g and a porosity of 20 pores per inch (25.4 mm); the impregnation mixture consists of furfuryl resin (130 g), hexamethylenetetramine (5% by weight of the resin) and silicon with a particle size of 3 to 5 microns under the conditions given below. The specific surface areas are measured by adsorption of nitrogen after pyrolysis of the product in air (SiC without any residual carbon).

1. Effect of the thermal profile and of the incremental temperature:

| | b | c | thermal profile | linear velocity of argon in the reactor | specific surface area |
|---|---|---|---|---|---|
| Test 1 | 0.7 | 7.8 | A* | 0.4 cm/s | 7.8 $m^2/g$ |
| Test 2 | 0.7 | 7.5 | B** | 0.4 cm/s | 4.7 $m^2/g$ |
| Test 3 | 0.7 | 7.6 | C*** | 0.4 cm/s | 1.3 $m^2/g$ |
| where | | A*: | 5° C./min | 20° C. → 250° C. | |
| | | | 1° C./min | 250° C. → 1000° C. | |
| | | | 3° C./min | 1000° C. → 1350° C. | |
| | | | 3 h at 1350° C. | | |
| | | B**: | 1° C./min | 20° C. → 800° C. | |
| | | | 0.3° C./min | 800° C. → 1350° C. | |
| | | | 3 h at 1350° C. | | |
| | | C***: | 5° C./min | 20° C. → 250° C. | |
| | | | 1° C./min | 250° C. → 1000° C. | |
| | | | 3° C./min | 1000° C. → 1500° C. | |
| | | | 3 hr at 1500° C. | | |

2. Effect of the flow rate of inert gas (or linear velocity of the inert gas in order to get away from the geometry of the reactor)

| | b | c | thermal profile | linear velocity of argon | specific surface area |
|---|---|---|---|---|---|
| Test 1 | 0.7 | 7.8 | A* | 0.4 cm/s | 7.8 $m^2/g$ |
| Test 4 | 0.7 | 7.5 | A* | 0.2 cm/s | 14.4 $m^2/g$ |
| Test 5 | 0.7 | 7.5 | A* | 0.08 cm/s | 20.4 $m^2/g$ |

3. Effect of factor b
b = weight of Si/weight of resin

| | b | c | thermal profile | linear velocity of argon | specific surface area |
|---|---|---|---|---|---|
| Test 1 | 0.7 | 7.8 | A | 0.4 cm/s | 7.8 $m^2/g$ |
| Test 6 | 0.5 | 7.5 | A | 0.4 cm/s | 13.2 $m^2/g$ |

What is claimed is:

1. Process for manufacturing a foam consisting essentially of silicon carbide and containing not more than 0.1 wt % residual silicon, comprising the steps of:

a) impregnating a preformed polyurethane foam with a suspension of powdered Si in an oxygenated organic resin, optionally containing a solvent, the weight ratio of Si to resin being about 0.58 to 1.17, and the oxygen content of the resin being at least about 15 wt %, adjusting the weight ratio of resin to polyurethane foam to between 2.5 and 5 by eliminating excess resin;

b) eliminating any solvent present in the impregnated foam;

c) polymerizing the resin in the impregnated foam by progressively increasing the temperature to 250° C. with a rate of temperature increase of about 5° C./min;

d) simultaneously carbonizing the polyurethane foam and polymerized resin by progressively increasing the temperature from 250° to 1000° C. in an inert atmosphere containing less than 100 ppm oxygen and less than 1% nitrogen;

e) carburizing the silicon in the carbonized foam and resin by progressively increasing the temperature to a temperature T between 1300° C. and 1600° C. with a rate of temperature increase of about 3° C./min in an inert atmosphere, and maintaining T for at least two hours in an inert atmosphere to obtain silicon carbide; and f) cooling the silicon carbide obtained.

2. Process according to claim 1, wherein at step d) the mean rate of temperature rise is between 1° and 10° C./min, and at step e) the temperature T is between 1300.

3. Process according to claim 2, wherein the inert atmosphere is commercially pure argon.

4. Process according to claim 2, wherein at step d), the atmosphere circulates with a mean velocity less than 1 cm/sec.

5. Process according to claim 1, wherein the temperature T is between 1400° and 1600° C.

6. Process according to claim 1, wherein the polymerized resin contains in its molecule at least 25% by weight of oxygen atoms.

7. Process according to claim 6, wherein the resin contained in the suspension is a furfuryl resin.

8. Process, according to claim 1, wherein the silicon contained in the suspension has a particle size centred on a mean value of less than 75 micrometers.

9. Process according to claim 8, wherein the silicon contained in the suspension has a mean particle size of less than 10 micrometers.

10. Process according to claim 1, wherein characterised in that the silicon carbide is subjected finally to an oxidation treatment in order to eliminate any excess of carbon.

11. Process according to claim 1, additionally comprising, before step a, attacking said preformed foam by means of an alkaline solution containing about 4% soda at 65° C. for 5 to 10 minutes, to increase open porosity in the foam.

12. Process for manufacturing a catalyst with a silicon carbide carrier with a large specific surface area according to claim 1, wherein the silicon carbide is subsequently impregnated with an active phase based on platinum, rhodium or palladium.

13. Process according to claim 4, wherein the mean velocity is between 0.05 and 0.2 cm/sec.

14. Process according to claim 1, wherein, in step d), the temperature increases at a rate of 1° to 10° C./min.

* * * * *

UNITED STATES PATENT AND TRADEMARK OFFICE
CERTIFICATE OF CORRECTION

PATENT NO. : 5,429,780
DATED : July 4, 1995
INVENTOR(S) : MARIE PRIN et al

It is certified that error appears in the above-indentified patent and that said Letters Patent is hereby corrected as shown below:

Claim 2, column 11, line 33, after "1300"

insert ---and 1400°C---.

Signed and Sealed this

Twenty-eighth Day of May, 1996

Attest:

BRUCE LEHMAN

*Attesting Officer*   *Commissioner of Patents and Trademarks*